April 2, 1940.  E. G. ULRICH  2,195,636
TRUCK AND TRAILER COUPLING
Filed Oct. 1, 1937  5 Sheets-Sheet 1
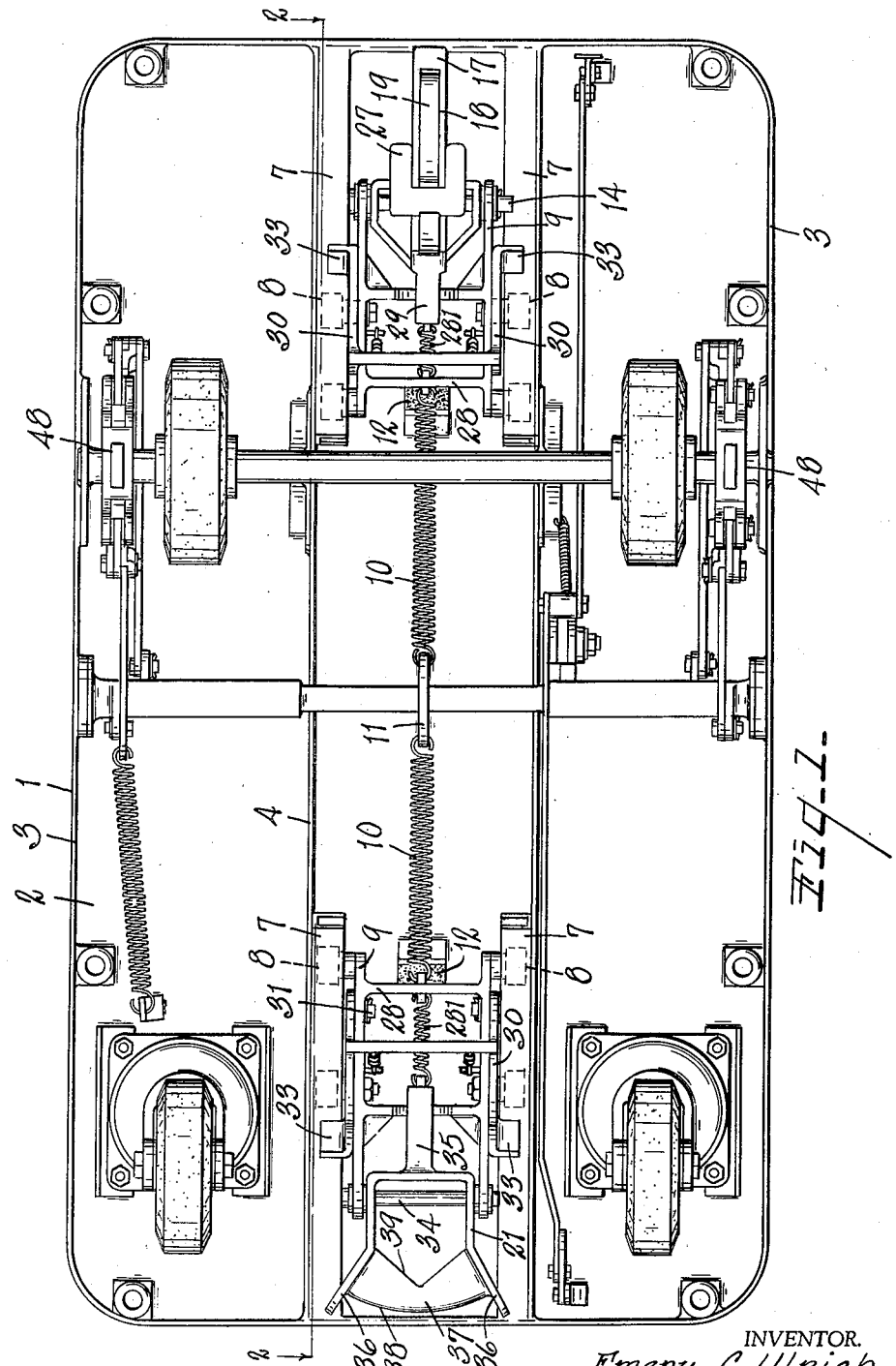
INVENTOR.
Emery G Ulrich
BY Earl & Chappell
ATTORNEYS

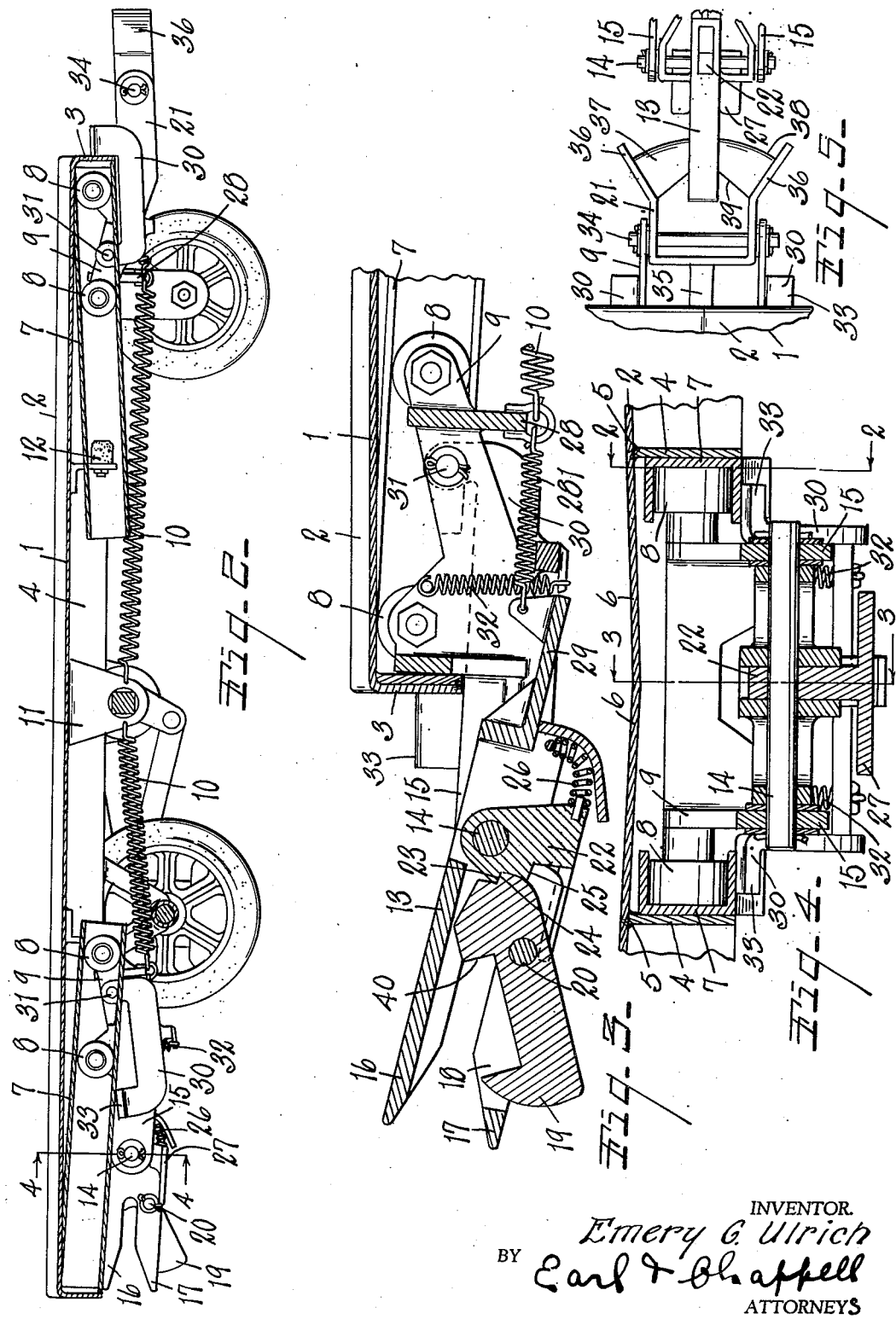

April 2, 1940.　　　E. G. ULRICH　　　2,195,636
TRUCK AND TRAILER COUPLING
Filed Oct. 1, 1937　　　5 Sheets-Sheet 3

INVENTOR.
Emery G. Ulrich
BY Earl & Chappell
ATTORNEYS

April 2, 1940.   E. G. ULRICH   2,195,636
TRUCK AND TRAILER COUPLING
Filed Oct. 1, 1937   5 Sheets-Sheet 4

INVENTOR.
Emery G. Ulrich
BY Earl & Chappell
ATTORNEYS

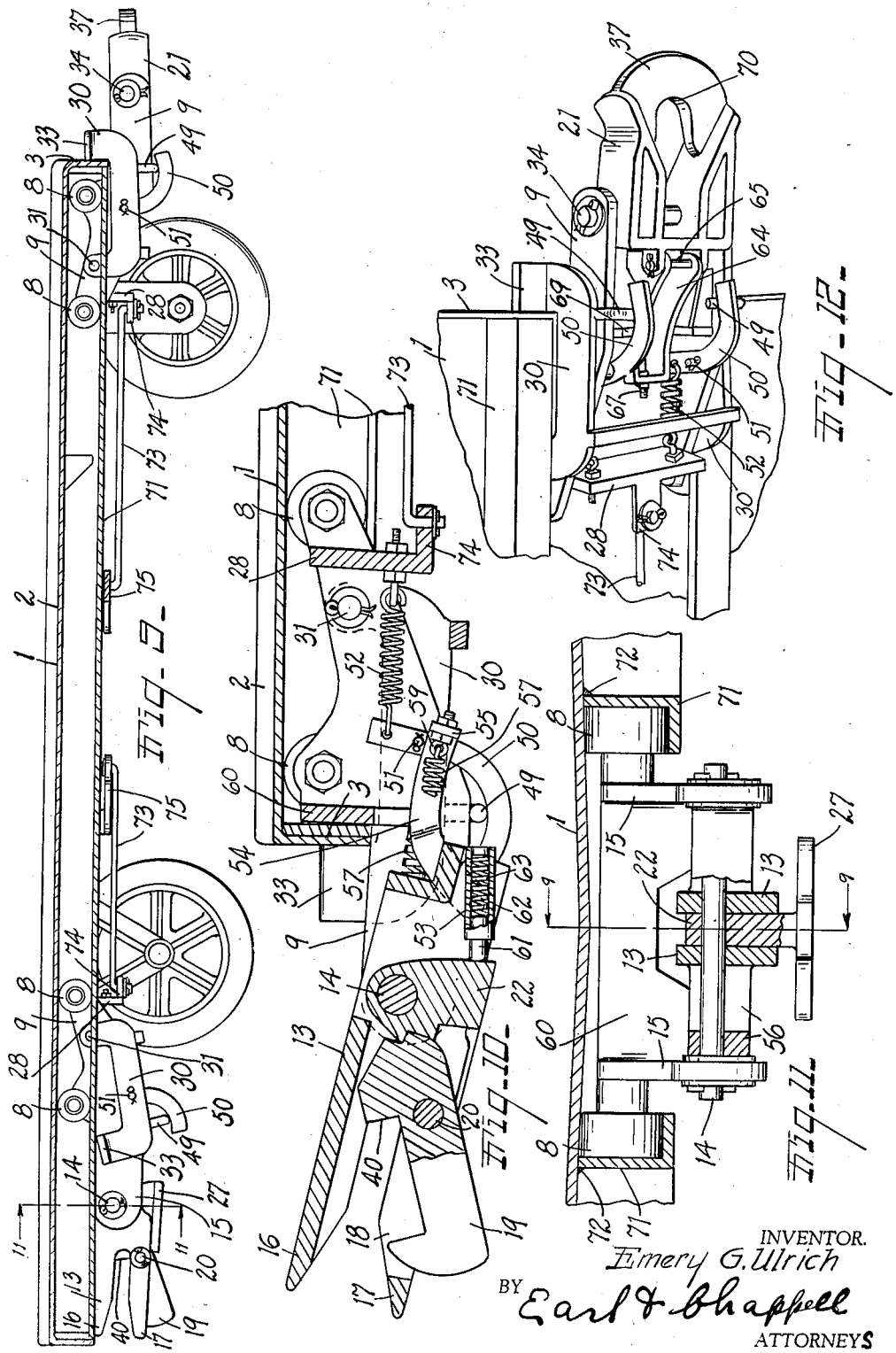

Patented Apr. 2, 1940

2,195,636

UNITED STATES PATENT OFFICE 2,195,636

TRUCK AND TRAILER COUPLING

Emery G. Ulrich, Lakewood, Ohio

Application October 1, 1937, Serial No. 166,825

20 Claims. (Cl. 280—33.15)

This invention relates to improvements in truck and trailer couplings.

Trucks and trailers are widely used in factory warehouses and by railways for handling freight, and it is a common practice to provide such trucks with couplings which enable the coupling of a plurality of trucks in a train. These couplings project at both ends of the truck body and consequently occupy valuable space when the trucks are stored on a platform, in a warehouse, or on freight cars. Further, they prevent or handicap positioning the trucks as is sometimes convenient in loading or unloading, and provide means for causing injury to the coupling or to other objects or to persons walking around the trucks.

The objects of this invention are:

First, to provide a coupling equipment for warehouse and trailer trucks with means which is collapsed beneath the body of the truck when not in use.

Second, to provide a structure having these advantages in which the coupling may be easily and quickly extended to operative position and effectively held in operative position.

Third, to provide a structure having these advantages in which the coupling is automatically retracted when retraction is desired.

Fourth, to provide an improved coupling in which the coupling members are automatically engaged when complementary coupling members are presented to each other.

Fifth, to provide an improved coupling in which the coupling may be effected from considerable variations in the angle of presentation of the coupling members and in which the draft is automatically centered and a central pivot point maintained.

Sixth, to provide a coupling embodying these advantages which is simple in its parts and at the same time is strong and durable and easily manipulated.

Further objects relating to details of construction and operation will appear from the description to follow. The invention is pointed out in the claims.

A structure illustrating the features of my invention is shown in the accompanying drawings, in which:

Fig. 1 is an inverted view of a trailer truck of the warehouse or freight handling type embodying the features of my invention.

Fig. 2 is a longitudinal section taken on line 2—2 of Figs. 1 and 4.

Fig. 3 is an enlarged detail section taken on line 3—3 of Fig. 4 with the coupling head extended.

Fig. 4 is a fragmentary view mainly in transverse section, taken on line 4—4 of Fig. 2.

Fig. 5 is a fragmentary plan view showing the complementary coupling members of a pair of trucks in engagement.

Fig. 9 is a view in section on line 9—9 of Fig. 11, illustrating the arrangement of parts in the modified form of Fig. 8.

Fig. 10 is an enlarged fragmentary view illustrating details of construction of the coupler head and elements associated therewith in the modified form of Fig. 8.

Fig. 11 is an enlarged fragmentary sectional view on line 11—11 of Fig. 9.

Fig. 12 is a fragmentary perspective view of the coupler head employed at the end of the truck opposite that illustrated in Fig. 10.

Figure 6:
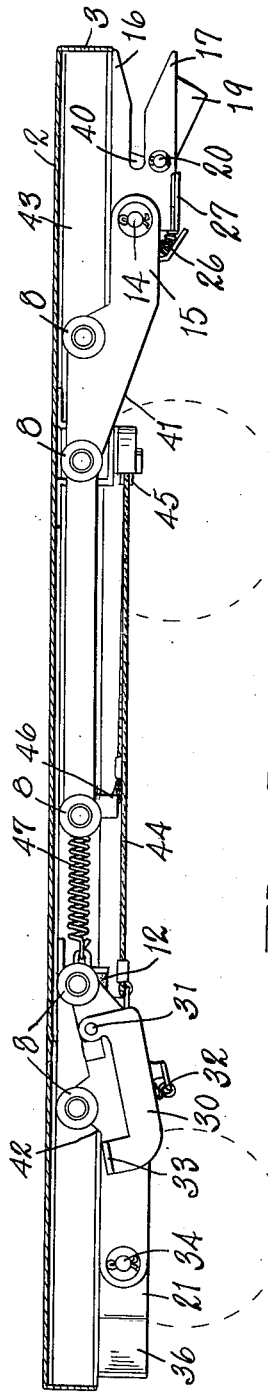
Fig. 6 is a detail view partially in longitudinal section, of a modified form or embodiment of the invention.

In the embodiment of my invention illustrated in the accompanying drawings, the truck body, designated generally by the numeral 1, is formed of sheet metal and comprises a platform 2 with downwardly projecting border flanges 3. Longitudinal sills 4 are secured at their ends to the end flanges which constitute end rails and are suitably secured to the platform, welding being indicated at 5. This platform comprises two side portions 6 inclined inwardly from their edges to the center of the body. This provides a surface which tends to retain the load and avoids the necessity of side rims commonly used on trucks of this character and the objections incident thereto. Loading and unloading are facilitated by my improvement and the likelihood of tearing or rupturing cartons and containers, which frequently occurs as they are dragged over the retaining ledges, is obviated. Further, a complete support is provided for the bottoms of the containers and cartons as distinguished from spaced supports which result when one end or edge of a carton is rested upon a retaining ledge and the other upon the platform of the truck.

Beneath the truck at each end thereof is mounted a pair of tracks or oppositely facing channeled ways 7 receiving the rollers 8 on the coupler carriages 9. These ways are preferably inwardly inclined so that gravity urges the carriages to their inner positions. However, I preferably employ return springs 10 which are coupled to a bracket 11 and to the inner ends of the coupler carriages. Padded bumpers or stops 12 are provided to limit the inward travel of the carriages.

It will be understood that there is a coupler unit at each end of the truck body and that these are complementary so that trucks may be connected in series. One carriage carries the coupler head 13 which is pivoted at 14 on the forwardly projecting arms 15 of the carriage. This coupler head is provided with vertically spaced jaws 16 and 17, the lower jaw 17 having a longitudinal slot 18 therein in which the upwardly facing coupling hook 19 is supported by means of the pivot 20. The jaws are flared at their forward ends to better receive the complementary bail-like coupling member 21 of another truck. The coupling hook 19 is retained in its coupled or engaging position by means of the spring actuated manually releasable pawl 22 which is mounted on the pivot 14 and provided with a suitable engaging part coacting with the keeper 23 on the inner end of the coupling hook 19. In the embodiment illustrated, this holding pawl is adapted to yieldably hold the coupling hook in its open position as well as in its closed position, being provided with an engaging surface 24 for engaging the keeper 23 when the parts are in disengaged position and with an engaging portion 25 to engage the keeper when the coupling hook is in its engaged position. The spring 26 urges the pawl to engaged position. Hand pieces 27 are provided for releasing the pawl, which permits the coupling hook to drop to open position.

The coupling head is yieldingly held in its coupling position when the carriage is actuated, by means of the coil spring 281 connected to a cross piece 28 on the carriage and to an inwardly projecting arm 29 on the coupling head. When the carriage is in its retracted position, as shown in Fig. 2, the spring yields to allow the front end of the coupling head to swing downwardly under the end rail of the platform.

To hold the carriage in its actuated position, I provide a latching member 30 which is pivoted at 31 and urged upwardly by the spring 32 to engage the end of the platform. This latch member is provided with a foot piece 33 to facilitate releasing. To retract the carriage and the coupling members below the platform, it is only necessary to press downwardly on the latch. The carriage for the bail-like coupling member 21 is the same as that described for the coupling head. This bail-like coupling member 21 is mounted on the pivot 34 and has a rearwardly projecting arm 35 to which the spring 10 is connected. The bail-like member has forwardly diverging arms 36 between which the cross piece 37 is disposed. This cross piece has a curved front edge 38 and a V-shaped rear edge 39. The cross piece is adapted to enter between the jaws of the coupling head and to engage the tappet 40 on the coupling hook 19 to automatically actuate the coupling hook to engaged position.

The coupling head may be presented to the cross member 37 in quite a wide range of positions, the diverging arms 36 being substantially wider than the cross piece and projecting forwardly beyond the same, so that they serve as guides during the coupling operation. The V-shaped rear edge 39 of the engaging member of the coupling 21 serves to center the coacting coupling member and to center the draft thereon and maintain it in a centered position so that effective trailing results even where turns are being made. These features are very desirable, not only for facilitating the coupling, but in manipulating the coupled trucks.

Figure 7:
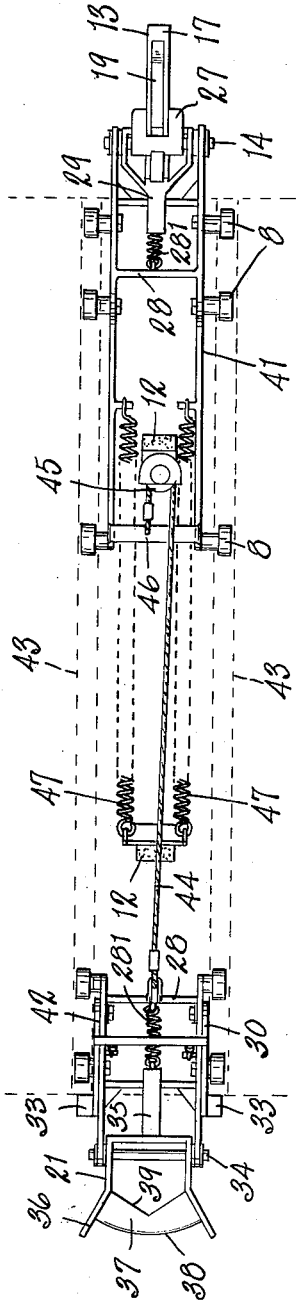
Fig. 7 is a fragmentary inverted view of the structure shown in Fig. 6, various parts being omitted and others skeletonized or indicated by dotted lines.
Figure 8:
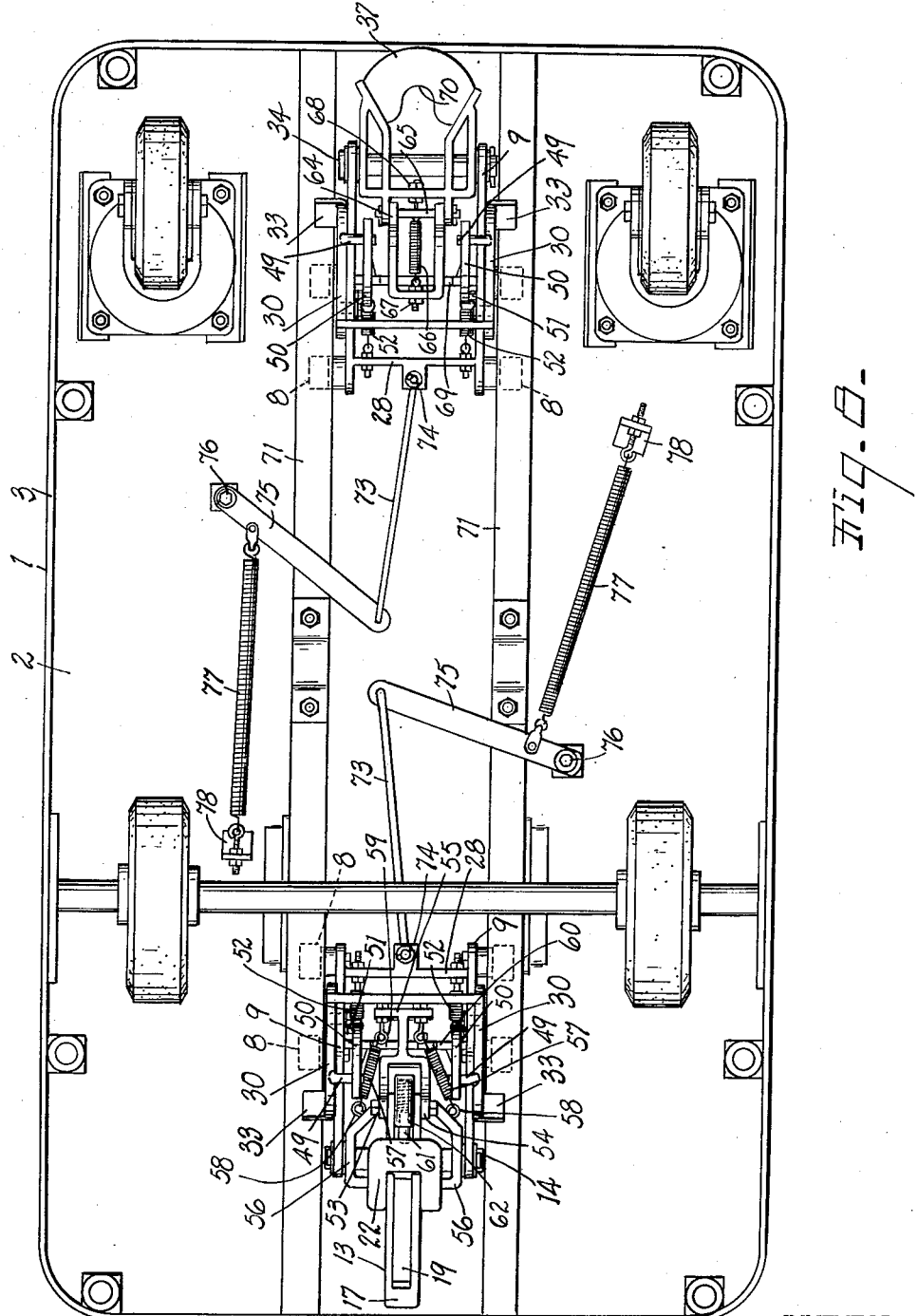
Fig. 8 is an inverted plan view of a truck having a modified form of my invention associated therewith.

In the embodiment of my invention shown in Figs. 6 and 7, the carriages 41 and 42 carry the coupling members 13 and 21 respectively. The ways 43 in this embodiment are shown as extending from end to end of the truck body. The carriages are connected by the cable 44 which is passed over the guide pulley or sheave 45 arranged in front of the point of connection 46 in the cable to the carriage 41. The carriage retracting springs 47 are both attached to the carriage 41. With this arrangement of parts, the carriages are simultaneously advanced and retracted, and this avoids the necessity of manipulating the carriages from both ends of the truck. It will be observed that only one carriage, namely, the carriage 42 in the embodiment illustrated, is provided with the latch member 30.

In Figs. 8 to 12, inclusive, I illustrate a still further modified form of my invention, wherein the latching members 30 have welded or otherwise secured thereto the inwardly extending bars 49 adapted to be contacted from beneath by the curved bails or hooked arms 50 which are pivoted to the coupler carriages at 51. Arms 50 are urged in clockwise direction as viewed in Fig. 10 by coil springs 52 secured to the cross piece 28 and the ends of the arms. By this expedient, the latching members are resiliently urged to locking position.

The coupler head 13 has pivotally connected thereto at 53 the arms of a curved forked member 54 (see Fig. 8), said member terminating at its end opposite the fork in a T-head 55. A pair of spacer elements 56 are welded to the coupler head on either side of the same, with the pivot 14 passing through holes drilled in the spacer members, and coil springs 57 are interposed between eyes 58 on the said spacer members and further eyes 59 adjustably mounted on T-head 55.

The carriage cross bar 60 normally serves as a stop engaging forked member 54 to limit upward movement of the same. However, it will be perceived that the pivotal connection of forked member 54 to the coupler head 13 furnishes a spring hinge allowing a certain further pivotal movement of the coupler head 13 around its pivot 14 after member 54 engages stop 60 without damaging the parts.

In the modification of Figs. 8 to 12, for the purpose of urging manually releasable pawl 22 resiliently into engagement with coupling hook 19, I provide a spring urged plug 61 slidable in a barrel 62 appropriately secured to the cross head, a coil compression spring 63 serving to maintain engagement of the plug with the pawl At the opposite end of the carriage, the construction is for the most part similar. See Fig. 12. In place of the forked hinge member 54 provided with the T-head as described, I employ a U-shaped member 64 having the arms thereof pivoted to coupling member 21 by a pin 65. A coil spring 66 adjustably anchored to the bight of the U-shaped member at 67 and adjustably connected at its other end to the coupling member 21, as indicated at 68, serves to provide the resilient hinge action when the U-shaped member strikes the stop provided by the cross bar 69 on the corresponding carriage 9.

By the aforenoted construction, a certain amount of cushioned pivotal movement is allowed when the coupling head 13 and/or coupling member 21 are swung downwardly about their respective pivot points 14 and 34 without damaging the parts.

It will be observed that the shape of the cross piece 37 in the modification of Figs. 8 to 12, inclusive, is somewhat different from that illustrated in Figs. 1 to 7, inclusive, inasmuch as the rear edge thereof is in the form of a rounded bight 70, as distinguished from the V-shaped rear edge 39 of the first described modifications. However, it is desired to point out that in each modification the cross piece is relatively flat and wide and that the coupling hook 19 in each modification cooperates with the jaw 16 to provide a recess whose section corresponds to the flat relatively wide section of the cross piece. In other words, there is a minimum of free movement at and between the jaws, the entire pivotal action for all practical purposes taking place around the pivots 14 and 34.

The embodiment of Figs. 8 to 12, inclusive, includes the formation of ways 7 from a pair of elongated L-shaped members 71 welded to the platform at 72. However, it will be apparent that channels as illustrated in Fig. 4 may be employed if desired. Moreover, the ways are indicated as extending parallel with the platform throughout the length thereof rather than at a slight angle. However, it will be appreciated that this feature may be altered if desired.

Upon releasing the latch members 30, the carriages 9, or either one thereof, are withdrawn on their rollers 8 in ways 7 by means of links 73 pivoted to offsets 74 on cross bars 28, the links being in turn pivotally connected to levers 75. Levers 75 are pivoted to the platform at 76 and are spring urged to exert a retractile force on links 73 by coil tension springs 77 adjustably anchored at 78.

One of the advantages of these retracting couplings is that it enables the use of these trucks in warehouses and on freight cars; that is, instead of unloading the truck onto the freight car, the truck itself may be run into the freight car or upon the platform of an open freight car. In Fig. 1, I have illustrated a blocking or anchoring means for blocking or anchoring the truck in position. This mechanism is designated generally by the numeral 48. I have not described or illustrated this mechanism in detail in this application, as it is the subject matter of my Letters Patent No. 2,020,386 of November 12, 1935, and my Letters Patent No. 2,169,508, of August 15, 1939. It will be appreciated, however, that such mechanism does constitute a feature of very substantial convenience in connection with my invention, the subject matter of this application.

I have illustrated and described my improvements in embodiments which I have found highly satisfactory. I have not attempted to illustrate or describe other embodiments or adaptations, as it is believed that this disclosure will enable those skilled in the art to embody or adapt my improvements as may be desired.

Having thus described my invention, what I claim as new and desire to secure by Letters Patent is:

1. In a trailer truck, the combination with the truck body, of longitudinally disposed ways disposed below the truck body at each end thereof, coupler carriages mounted on said ways, coupling members mounted on said carriages so that they are projected beyond the ends of the truck body when the carriages are in their actuated positions, spring actuated latching members on said carriages adapted to engage the ends of the truck body when the carriages are in their actuated positions, said latching members having foot pieces for facilitating the manual release thereof, and springs acting to yieldably hold said coupling members in position to coact with a complementary coupling member when the carriages are in their actuated positions.

2. In a trailer truck, the combination with the truck body, of longitudinally disposed ways disposed below the truck body at each end thereof, coupler carriages mounted on said ways, coupling members mounted on said carriages so that they are projected beyond the ends of the truck body when the carriages are in their actuated positions, and spring actuated latching members on said carriages adapted to engage the ends of the truck body when the carriages are in their actuated positions, said latching members having foot pieces for facilitating the manual release thereof.

3. In a trailer truck, the combination with the truck body, of longitudinally disposed ways disposed below the truck body at each end thereof, coupler carriages mounted on said ways, coupling members mounted on said carriages so that they are projected beyond the ends of the truck body when the carriages are in their actuated positions, means at all times exerting resilient retractile force on said carriages, and means acting to yieldably hold said coupling members in position to coact with a complementary coupling member when the carriages are in their actuated positions.

4. In a trailer truck, the combination with the truck body, of a longitudinally disposed inwardly inclined way disposed below the truck body at one end thereof, a coupler carriage mounted on said way, a coupling member mounted on said carriage so that it is projected beyond the end of the truck body when the carriage is in its actuated position, and a manually releasable spring actuated latching member on said carriage adapted to engage the end of the truck body when the carriage is in its actuated position.

5. In a trailer truck, the combination with the truck body, of a longitudinally disposed way disposed below the truck body at one end thereof, a coupler carriage mounted on said way, a coupling member mounted on said carriage so that it is projected beyond the end of the truck body when the carriage is in its actuated position, and a manually releasable spring actuated latching member on said carriage adapted to engage the end of the truck body when the carriage is in its actuated position.

6. In a trailer truck, the combination with the truck body, of a longitudinally disposed way disposed below the truck body, a coupler carriage mounted on said way, a spring acting to retract said carriage, a couping member mounted on said carriage so that it is projected beyond the end of the truck body when the carriage is in its actuated position, and a manually releasable spring actuated latching member on said carriage adapted to engage the end of the truck body when the carriage is in its actuated position.

7. In a trailer truck, the combination with the truck body, of a longitudinally disposed way disposed below the truck body, a coupler carriage mounted on said way, a coupling member mounted on said carriage so that it is projected beyond the end of the truck body when the carriage is in its actuated position, and a manually releasable spring actuated latching member on said carriage adapted to engage the end of the truck body when the carriage is in its actuated position.

8. In a trailer truck, the combination with the truck body, of coupler carriages mounted below the truck body at each end thereof, means acting to retract said carriages, coupling members mounted on said carriages so that they are projected beyond the ends of the truck body when the carriages are in their actuated positions, and manually releasable latching members for positively holding said carriages in their actuated positions in opposition to said retracting means.

9. In a trailer truck, the combination with the truck body, a coupling member mounted on said body and adapted to be projected beyond the ends of the truck body when in actuated position, resilient means at all times opposing movement of said coupling member to actuated position, and manually releasable latch means associated with said coupling member to positively hold the coupling member in actuated position relative to the body.

10. In a trailer truck, the combination with the truck body, of coupler carriages mounted below the truck body at each end thereof, coupling members mounted on said carriages so that they are projected beyond the ends of the truck body when the carriages are in their actuated positions, resilient retractile means opposing movement of the carriages to actuated position, and springs acting to yieldably hold said coupling members in position to be engaged by another coupling member when the carriages are in their actuated positions.

11. In a trailer truck the combination with the truck body, of a coupler carriage withdrawably mounted below the truck body, means acting to retract said carriage, a coupling member mounted on said carriage so that it is projected beyond the end of the truck body when the carriage is in its actuated position, a manually releasable latching member for positively holding said carriage in its actuated position, and means on said carriage for resiliently sustaining the coupling member in operative position for engagement with a coacting coupling member when said carriage is in actuated position.

12. In a trailer truck, the combination with the truck body, of a coupler carriage mounted below the truck body, a coupling member mounted on said carriage so that it is projected beyond the end of the truck body when the carriage is in its actuated position, spring urged, manually releasable latch means for positively holding the carriage in actuated position, and means for resiliently sustaining said coupling member for engagement with a coacting coupling member when the carriage is in said actuated position.

13. In a trailer truck, the combination with the truck body, of a coupler carriage mounted below the truck body, a coupling member mounted on said carriage so that it is projected beyond the end of the truck body when the carriage is in its actuated position, releasable latch means to hold the carriage in actuated position, and means acting to yieldably hold said coupling member in position to be engaged by another coupling member when the carriage is in its actuated position.

14. In a trailer truck, the combination with the truck body, of coupler carriages mounted below said truck body for travel longitudinally thereof, a retracting spring connected to one of said carriages, a cable connecting said carriages, said cable being passed over a guide pulley so that the carriages are simultaneously actuated and retracted, manually releasable latching means for holding said carriages in their actuated positions, and coupling members mounted on said carriages so that they will project beyond the ends of the truck body when the carriages are in their actuated positions.

15. In a trailer truck, the combination with the truck body, of coupler carriages mounted below said truck body for travel longitudinally thereof, a cable connecting said carriages, said cable being passed over a guide pulley so that the carriages are simultaneously actuated and retracted, and coupling members mounted on said carriages so that they will project beyond the ends of the truck body when the carriages are in their actuated positions.

16. In combination, a trailer truck having a platform, and retractile coupling means therefor comprising a carriage retractably mounted relative to the platform, a latch member pivotally mounted on the carriage and releasably engageable with the platform to hold the carriage from retracted position, and means for resiliently urging said latch member into locking position, comprising a member pivoted on the carriage, a bar carried by the latch member and engageable by said pivoted member, and means resiliently urging the pivoted member against said bar.

17. In a trailer truck, a truck body comprising a platform of sheet metal, angle iron sills secured in spaced relation on the underside of the platform with their angles facing inwardly and providing tracks, carriages mounted on said tracks, coupling members mounted on said carriages so that they are projected beyond the ends of the truck body when the carriages are in their actuated positions, manually releasable latching members for holding said carriages in their actuated positions, means for retracting said carriages comprising levers pivotally mounted on the underside of the truck body to project inwardly below the sills, links connecting the swinging ends of said levers with said carriages, and retracting springs connected to said levers.

18. In a trailer truck, a truck body, carriages reciprocatingly mounted on the underside of said body, coupling members mounted on said carriages so that they are projected beyond the ends of the truck body when the carriages are in their actuated positions, manually releasable latching members for holding said carriages in their actuated positions, means for retracting said carriages comprising levers pivotally mounted on the underside of the truck body, links connecting the swinging ends of said levers with said carriages, and retracting springs connected to said levers adjacent their pivots.

19. In a trailer truck, a truck body, carriages reciprocatingly mounted on the underside of said body, coupling members mounted on said carriages so that they are projected beyond the ends of the truck body when the carriages are in their actuated positions, manually releasable latching members for holding said carriages in their actuated positions, means for retracting said carriages comprising levers pivotally mounted on the underside of the truck body, links connecting the swinging ends of said levers with said carriages, and retracting springs connected to said levers.

20. In a trailer truck, a truck body, coupling members mounted below said body on opposite ends thereof for travel longitudinally thereof in opposite directions, and means for simultaneously actuating and retracting said coupling members to and from actuated position projecting beyond the ends of the body, including resilient means for opposing movement of the coupling members to actuated position, and means for latching said members in actuated position.

EMERY G. ULRICH.